United States Patent [19]

Occelli

[11] Patent Number: 5,028,406
[45] Date of Patent: Jul. 2, 1991

[54] CRYSTALLINE GALLIOSILICATE WITH THE MORDENITE STRUCTURE

[75] Inventor: Mario L. Occelli, Yorba Linda, Calif.

[73] Assignee: Union Oil Company of California, Los Angeles, Calif.

[21] Appl. No.: 443,726

[22] Filed: Nov. 29, 1989

[51] Int. Cl.$^5$ ............................................. C01B 33/34
[52] U.S. Cl. .................................... 423/328; 502/61; 502/78; 208/109; 208/110; 208/111; 208/134; 208/136; 208/137; 208/46; 568/700; 518/713; 518/714; 518/715; 518/728

[58] Field of Search ............... 423/326, 328, 329, 330; 502/61, 78; 208/109–111, 134, 136, 137, 46; 568/700; 518/713, 714, 715, 728

[56] References Cited

U.S. PATENT DOCUMENTS

| | | | |
|---|---|---|---|
| 3,431,219 | 3/1969 | Argauer | 502/61 |
| 4,205,052 | 5/1980 | Rollmann et al. | 423/328 |
| 4,377,502 | 3/1983 | Klotz | 502/77 |
| 4,390,457 | 6/1983 | Klotz | 502/78 |
| 4,495,303 | 1/1985 | Kuehl | 502/62 |
| 4,521,297 | 6/1985 | Angevine et al. | 208/111 |
| 4,525,466 | 6/1985 | Moretti et al. | 423/328 |

FOREIGN PATENT DOCUMENTS 0130013  1/1985  European Pat. Off. ............ 423/328

OTHER PUBLICATIONS

J. M. Newsam, D. E. W. Vaughan, "Structural Studies of Galliosilicate Zeolites," *New Developments in Zeolite Science and Technology*, Proceedings of the 7th International Zeolite Conference, Tokyo, 1986, pp. 457–464.

*Primary Examiner*—H. M. S. Sneed
*Assistant Examiner*—R. Bruce Breneman
*Attorney, Agent, or Firm*—Yale F. Finkle; Gregory P. Wirzbicki

[57] ABSTRACT

A crystalline, galliosilicate molecular sieve having the mordenite structure and the following composition expressed in terms of oxide mole ratios in the anhydrous state:

$$Ga_2O_3 : xSiO_2 : yM_2O : tQ_2O$$

where M is an alkali metal, preferably sodium, Q is a quaternary ammonium cation, preferably a benzyltriethylammonium cation, x equals 5.0 to 30, y equals 0.1 to 0.99, preferably 0.40 to 0.90, t equals 0.01 to 0.9, preferably 0.1 to 0.6 and yet equals about 1.0. The crystalline, galliosilicate molecular sieve of the invention may be employed, after reducing its alkali metal content and decomposing Q, as a component of a catalyst which can be used in a variety of chemical conversion processes.

17 Claims, 2 Drawing Sheets

CRYSTALLINE GALLIOSILICATE WITH THE MORDENITE STRUCTURE

BACKGROUND OF THE INVENTION

This invention relates to crystalline galliosilicates and is particularly concerned with a crystalline galliosilicate molecular sieve having the mordenite structure and methods of producing such a molecular sieve.

Zeolites are well known natural and synthetic molecular sieves that can be defined as crystalline, three-dimensional aluminosilicates consisting essentially of alumina and silica tetrahedra which interlock to form discrete polyhedra. The polyhedra are interconnected to form a framework which encloses cavities or voids that are interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimension while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents and selective sorbents.

The pore size of a zeolite can vary from about 2.6 Angstroms for analcime to about 10.0 Angstroms for zeolite omega. The term 'pore size' as used herein refers to the diameter of the largest molecule that can be sorbed by the particular zeolite or other molecular sieve in question. The measurement of such diameters and pore sizes is discussed more fully in chapter 8 of the book entitled 'Zeolite Molecular Sieves,' written by D. W. Breck and published by John Wiley & Sons in 1974, the disclosure of which book is hereby incorporated by reference in its entirety. The pore size range of 2.6 to 10.0 Angstroms is particularly suited for molecular separation and catalytic processing. Analcime will sorb ammonia while excluding larger molecules whereas zeolite omega will sorb perfluorotributyl amine [$(C_4F_9)_3N$] while excluding any molecule having a diameter greater than about 10.0 Angstroms. All of the other approximately 150 zeolites now known have pore sizes falling within the range between 2.6 and 10.0 Angstroms.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at creating new molecular sieves by either substituting an element for the aluminum or silicon present in zeolitic molecular sieves or adding another element in addition to the aluminum and silicon. The term 'zeolite' or 'zeolitic' as used herein refers to molecular sieves whose frameworks are formed of substantially only silicon and aluminum atoms in tetrahedral coordination with oxygen atoms. One such class of new molecular sieves that has been created is that in which all the framework aluminum has been replaced by gallium. Specifically, it has been reported in European Patent Application No. 84304025.4 published on Jan. 2, 1985 as Publication No. 0 130 013 that a galliosilicate molecular sieve having the mordenite structure has been synthesized. The synthesis process as illustrated in Examples 1 and 2 involves the use of diethanolamine as a templating or directing agent. According to the examples, the hydrogel from which the galliosilicate mordenite was synthesized contained 32.4 moles of diethanolamine and 850 moles of water. The use of such large amounts of templating agent, which tends to be relatively expensive, greatly adds to the cost of the synthesized sieve while the use of such relatively large quantities of water results in less yield of sieve when the hydrogel is subjected to crystallization. Thus, the process disclosed in the European application has at least two major drawbacks that result in a relatively expensive galliosilicate mordenite.

Accordingly, it is one of the objects of the present invention to provide a less expensive crystalline, galliosilicate molecular sieve with the mordenite structure, and a method for preparing such a molecular sieve, which can be useful in many types of chemical conversion processes, particularly hydrocarbon conversion processes and processes to control atmospheric emissions of nitrogen oxides. This and other objects of the invention will become more apparent in view of the following description of the invention.

SUMMARY OF THE INVENTION

In accordance with the invention, it has now been found that a crystalline, galliosilicate molecular sieve comprising silicon, gallium and oxygen and having the mordenite crystal structure can be synthesized by mixing a source of gallia, a source of silica, a source of an alkali metal, a templating or directing agent comprising a mordenite selective quaternary ammonium compound and water to form a hydrogel substantially free of alumina in which the components have the following oxide mole ratios:

$SiO_2/Ga_2O_3 = 5$ to $40$
$M_2O/Ga_2O_3 = 1$ to $15$
$H_2O/Ga_2O_3 = 80$ to $500$
$Q_2O/Ga_2O_3 = 0.1$ to $20$ where M is an alkali metal and Q is the quaternary ammonium cation comprising the mordenite selective templating or directing agent. After the above-described hydrogel is formed, it is crystallized to form the synthetic, crystalline, galliosilicate molecular sieve of the invention. This molecular sieve, which is substantially free of alumina and aluminum, typically has the composition, expressed in terms of oxide mole ratios in the anhydrous state, of $$Ga_2O_3:xSiO_2:yM_2O:tQ_2O$$

where x equals 5.0 to 30, y equals 0.1 to 0.99, t equals 0.01 to 0.9, and y+t equals about 1.0. The X-ray powder diffraction pattern of the molecular sieve contains at least the d-spacings set forth in Table 1 below, which d-spacings are characteristic of the mordenite structure.

TABLE 1

| Interplanar d-spacings (Angstroms) | Relative Intensity (100 × $I/I_o$) |
|---|---|
| 13.6 ± 0.40 | 20–60 |
| 9.0 ± 0.40 | 50–100 |
| 6.6 ± 0.40 | 20–60 |
| 4.5 ± 0.20 | 20–60 |
| 4.0 ± 0.20 | 40–90 |
| 3.5 ± 0.10 | 50–100 |
| 3.3 ± 0.10 | 30–80 |
| 3.1 ± 0.10 | 30–70 |
| 2.9 ± 0.10 | 10–40 |

In a preferred galliosilicate molecular sieve, M is sodium and Q is a quaternary ammonium cation containing one or more benzyl groups.

DETAILED DESCRIPTION OF THE INVENTION

The crystalline, galliosilicate molecular sieve of the invention is prepared by crystallizing a hydrogel formed by mixing a source of gallia, a source of silica, a source of an alkali metal and a mordenite selective quaternary ammonium templating agent with water under conditions such that the various components react to form the desired hydrogel. Since a source of alumina or aluminum is not used in forming the hydrogel, the only alumina or aluminum present in the hydrogel or the crystallized galliosilicate will be alumina or aluminum impurities in the source materials. Thus, the hydrogel and galliosilicate molecular sieve of the invention will normally contain less than about 0.2 weight percent alumina and less than about 0.2 weight percent aluminum, preferably less than about 0.1 weight percent of each, and will usually be substantially free of both alumina and aluminum.

The silica used in forming the hydrogel may be in the form of sodium silicate, silica hydrosols, silica gels, inorganic silica salts, silicic acid gels, aerosils, silicic acid sols, organic salts such as tetramethylammonium silicate and methyltriethoxysilane, and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicate (water glass) and aqueous colloidal dispersions of silica particles.

The source of alkali metal used in forming the hydrogel may be any alkali metal salt or hydroxide, however, a sodium salt or hydroxide is normally preferred. It is possible for the source of the alkali metal to also be the source of gallia utilized to form the hydrogel. Alkali metal gallates are examples of materials which serve as a source of both an alkali metal and gallia.

The gallia used to produce the hydrogel from which the galliosilicate molecular sieve of the invention is crystallized may be in the form of gallium oxide, gallium hydroxide, an alkali metal gallate or an inorganic gallium salt, such as gallium nitrate, gallium sulfate, or gallium acetate. As mentioned above, the source of the gallia may also be the source of the alkali metal used to form the hydrogel. In fact, a preferred source of gallia is prepared by dissolving gallium oxide in an aqueous solution of sodium hydroxide to form sodium gallate which is then used as a component to form the hydrogel.

The templating agent used to form the hydrogel is any quaternary ammonium compound which directs crystallization of the hydrogel toward the mordenite structure. Preferred templating agents include quaternary ammonium compounds that contain one or more benzyl radicals ($C_6H_5CH_2$—). Typically, the preferred templating agents have the formula:

where X is an inorganic anion, such as a halogen or a hydroxyl group, or an organic anion such as a methoxy group; $R_1$ is a substituted or unsubstituted benzyl radical; $R_2$, $R_3$ and $R_4$ are organic radicals which may be the same as or different than $R_1$ and the same as or different than each other and normally contain from 1 to about 10 carbon atoms, preferably from 1 to about 7 carbon atoms. $R_2$, $R_3$ and $R_4$ are typically derived from aliphatic, alicyclic or aromatic compounds and are preferably substituted or unsubstituted hydrocarbyl groups such as alkyl, alkenyl, alkynyl, aryl, akylaryl or arylalkyl radicals having from 1 to about 10 carbon atoms, preferably from 1 to about 7 carbon atoms. Typically, $R_1$, $R_2$, $R_3$ and $R_4$ will be free of oxygen atoms. Examples of the preferred quaternary ammonium compounds for use as the templating agent include benzyltrimethyl and benyltriethylammonium chloride. For purposes of this invention, an "organic radical or anion" is a radical or anion which contains at least 1 carbon atom whereas an "inorganic anion" is an anion which does not contain a carbon atom.

It has been surprisingly found that the above-identified templating agents are effective in directing crystallization of a galliosilicate hydrogel toward the mordenite structure. In addition, it has been found that the amount of such templating agents required to carry out the synthesis is significantly less—in some cases as much as ten times less —than the amount required if an amine such as diethanolamine is utilized. The ability to decrease the amount of the templating agent required to produce a galliosilicate with the mordenite structure means that the cost of production can be significantly reduced.

The hydrogel from which the galliosilicate molecular sieve of the invention is crystallized is normally prepared by first dissolving the source of gallia in an aqueous solution of the alkali metal hydroxide, preferably sodium hydroxide. The resulting solution is then mixed with the quaternary ammonium templating agent and a source of silica to form a gel which is vigorously stirred. A sufficient amount of the gallia source, the silica source, the source of alkali metal, the quaternary ammonium templating agent and water is used so that the resultant hydrogel contains the following oxide mole ratios of components:

$SiO_2/Ga_2O_3 = 5$ to 40, preferably 10 to 30
$M_2O/Ga_2O_3 = 1$ to 15, preferably 2 to 5
$H_2O/Ga_2O_3 = 80$ to 500, preferably 100 to 400
$Q_2O/Ga_2O_3 = 0.1$ to 20, preferably 0.5 to 4.0 where M is an alkali metal, preferably sodium, and Q is the quaternary ammonium cation comprising the templating agent.

After all of the components of the hydrogel have been combined together, the hydrogel is vigorously stirred at atmospheric pressure and at a temperature between about 20° C. and about 60° C., preferably at about ambient temperature, for from about 1 hour to two days, preferably between about 1 hour and about 10 hours. After stirring, the hydrogel is crystallized by heating, with or without stirring or agitation, for between about 1 week and 10 weeks, usually between about 2 weeks and 5 weeks, at temperatures in the range between about 70° C. and 250° C., preferably between about 90° C. and 175° C. The temperature is normally controlled within the above ranges to avoid the formation of phase impurities. After the hydrogel has been crystallized, the resulting slurry is passed to a filter, centrifuge or other separation device to remove the excess reactants or mother liquor from the crystallized molecular sieve. The crystals are then washed with water and dried at a temperature between about 50° C. and about 200° C. to remove surface water.

The dried crystals produced as described above comprise the molecular sieve of the invention and will normally have the following composition expressed in terms of oxide mole ratios in the anhydrous state:

$$Ga_2O_3 : xSiO_2 : yM_2O : tQ_2O \quad (1)$$

where M is an alkali metal, preferably sodium, Q is the quaternary ammonium cation which comprises the templating agent used in synthesizing the molecular sieve of the invention, x equals 5.0 to 30, preferably 6 to 15, y equals 0.1 to 0.99, t equals 0.01 to 0.9 and the sum of y and t equals approximately 1.0. The X-ray powder diffraction pattern of the crystallized molecular sieve of the invention will typically contain at least the d-spacings set forth in Table 1, preferably the d-spacings set forth in Table 2 below.

TABLE 2

| Bragg Angle 2-Theta (Degrees) | Interplanar d-spacings (Angstroms) | Relative Intensity (100 × I/I$_o$) |
|---|---|---|
| 6.3–6.7 | 14.0–13.2 | 20–60 |
| 9.4–10.3 | 9.4–8.6 | 50–100 |
| 12.6–14.3 | 7.0–6.2 | 20–60 |
| 14.3–15.2 | 6.2–5.8 | 5–20 |
| 15.2–16.4 | 5.8–5.4 | 5–35 |
| 18.9–20.6 | 4.7–4.3 | 20–60 |
| 21.1–23.3 | 4.2–3.8 | 40–90 |
| 23.3–24.7 | 3.8–3.6 | 5–30 |

TABLE 2-continued

| Bragg Angle 2-Theta (Degrees) | Interplanar d-spacings (Angstroms) | Relative Intensity (100 × I/I$_o$) |
|---|---|---|
| 24.7–26.2 | 3.6–3.4 | 50–100 |
| 26.2–27.8 | 3.4–3.2 | 30–80 |
| 27.8–29.7 | 3.2–3.0 | 30–70 |
| 29.7–31.9 | 3.0–2.8 | 10–40 |

Figure 1:
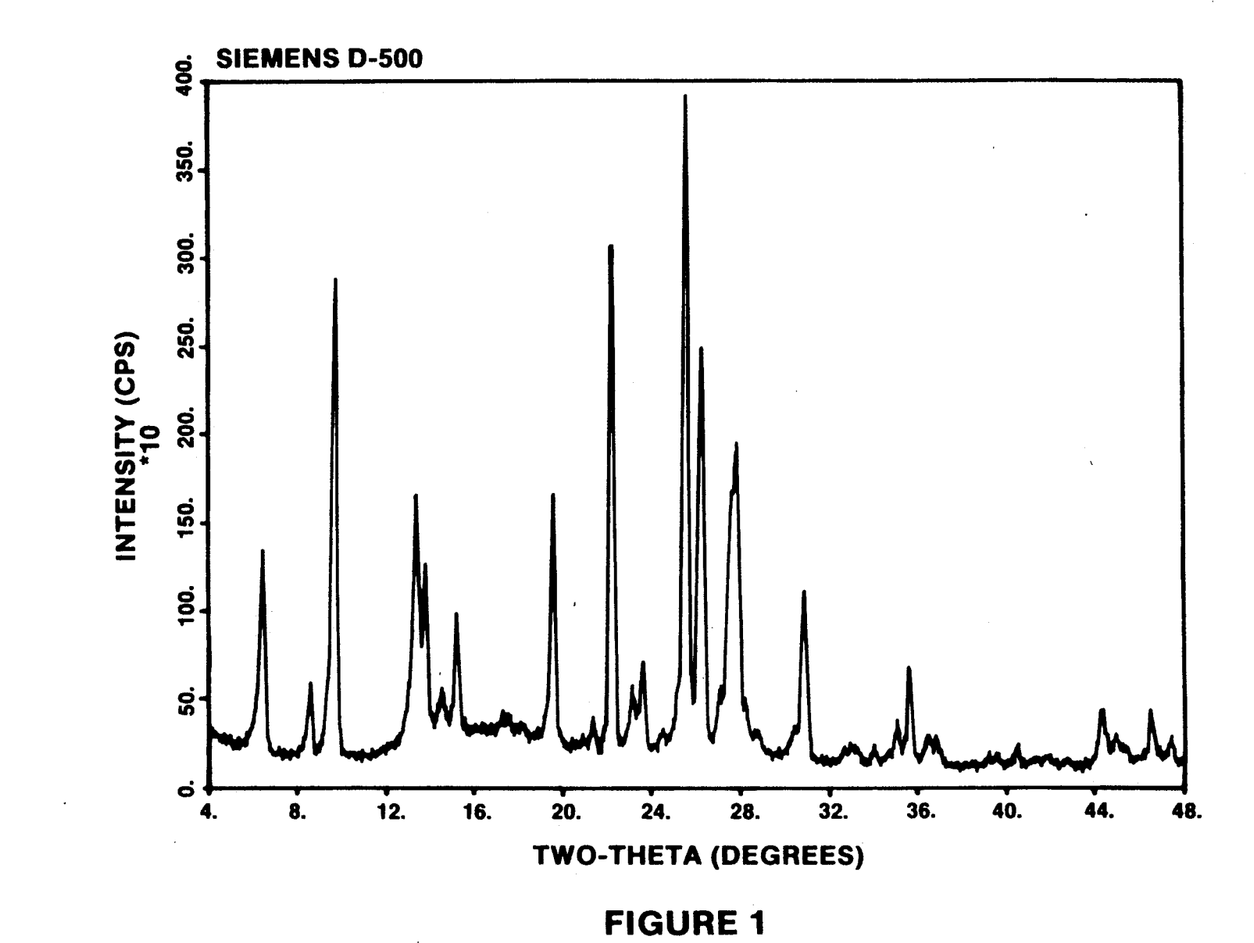
FIG. 1 in the drawing shows the X-ray powder diffraction pattern of a zeolite with the mordenite structure.

The X-ray powder diffraction data set forth in Tables 1 and 2 are characteristic of a molecular sieve having the mordenite structure. For comparison purposes, the X-ray powder diffraction data for a crystalline aluminosilicate zeolite with the mordenite structure is shown in FIG. 1, and the corresponding X-ray powder diffraction data are set forth in Table 3.

TABLE 3

| Bragg Angle 2-Theta (Degrees) | Interplanar d-spacings (Angstroms) | Relative Intensity (100 × I/I$_o$) |
|---|---|---|
| 6.462 | 13.6790 | 32.8 |
| 8.604 | 10.2776 | 11.6 |
| 9.715 | 9.1040 | 77.5 |
| 13.431 | 6.5927 | 41.0 |
| 13.830 | 6.4031 | 28.6 |
| 14.597 | 6.0685 | 6.0 |
| 15.252 | 5.8094 | 18.8 |
| 17.314 | 5.1218 | 2.8 |
| 18.164 | 4.8839 | 2.3 |
| 19.615 | 4.5260 | 40.1 |
| 21.429 | 4.1467 | 5.3 |
| 22.259 | 3.9939 | 81.7 |
| 23.186 | 3.8363 | 6.5 |
| 23.612 | 3.7680 | 11.1 |
| 24.536 | 3.6282 | 3.1 |
| 25.615 | 3.4778 | 100.0 |
| 26.291 | 3.3899 | 60.4 |
| 27.830 | 3.2058 | 44.7 |
| 28.751 | 3.1051 | 2.4 |
| 29.712 | 3.0069 | 2.0 |
| 30.463 | 2.9345 | 1.8 |
| 30.885 | 2.8953 | 24.8 |
| 32.718 | 2.7372 | 1.8 |
| 34.061 | 2.6322 | 3.3 |
| 35.081 | 2.5580 | 5.7 |
| 35.651 | 2.5184 | 14.7 |
| 36.511 | 2.4610 | 3.1 |
| 36.909 | 2.4354 | 3.2 |
| 39.250 | 2.2954 | 1.8 |
| 39.624 | 2.2746 | 1.8 |
| 40.520 | 2.2263 | 3.8 |
| 41.252 | 2.1885 | 1.0 |
| 41.860 | 2.1581 | 1.9 |

The X-ray powder diffraction data set forth in Tables 1 and 2 for the crystalline galliosilicate of the invention and in Table 3 for the zeolite with the mordenite structure are based on data obtained using a Siemens D-500 X-ray diffractometer with graphite-crystal monochromatized Cu-K alpha radiation. The peak heights I, and their position as a function of 2-theta, where theta is the Bragg angle, were read from the diffractometer output. From this output the relative intensities, $100 \times I/I_o$, where $I_o$ is the intensity of the strongest peak, were calculated. The interplanar spacing, d, in Angstroms corresponding to the recorded peaks were then calculated in accordance with standard procedures. It will be understood that the peak heights and d-spacings associated with the X-ray powder diffraction pattern of the galliosilicate molecular sieve of the invention may vary somewhat depending on various factors, e.g., heat treatment, unit cell composition, crystal size, and whether the molecular sieve has been exchanged with hydrogen ions or metal cations.

The water content of the crystalline, galliosilicate molecular sieve of the invention will depend on the method used for drying the particles formed upon crystallization. The amount of quaternary ammonium cations present in the dried molecular sieve will depend upon the silica-to-gallia mole ratio and the alkali metal content of the galliosilicate crystals. In general, the moles t of $Q_2O$ present, as shown in formula (1) above, will equal about 1.0 minus the moles of the alkali metal oxide present.

After the synthesized galliosilicate crystals have been washed and dried, they are typically treated in order to render them active for acid catalyzed reactions. This procedure normally comprises calcining the washed and dried crystals in air at a temperature between about 400° C. and about 700° C., preferably between about 500° C. and about 600° C., for between about 5 hours and about 15 hours to decompose the quaternary ammonium cations into gaseous products. After this calcination, the galliosilicate molecular sieve is exchanged with ammonium ions, hydrogen ions, polyvalent cations such as rare earth-containing cations, magnesium cations or calcium cations, or a combination of ammonium ions, hydrogen ions, and polyvalent cations, thereby lowering the sodium content to below about 2.0 weight percent, preferably below about 1.0 weight percent and most preferably below about 0.05 weight percent, calculated as $Na_2O$. When reducing the sodium content using an ammonium ion exchange technique, the molecular sieve is typically slurried for 1 to 5 hours at a temperature above ambient temperature but less than about 100° C. in an aqueous solution containing a dissolved ammonium salt, such as ammonium nitrate, ammonium sulfate, ammonium chloride and the like. Ordinarily, to achieve extremely low levels of alkali metal cations, the ion exchange procedure will be repeated at least twice, and occasionally several times. After the ammonium exchange or other treatment to reduce alkali metal content, the molecular sieve is again calcined in air, preferably at a temperature between about 350° C. and 550° C. to decompose the ammonium cations into ammonia, which is driven off during the calcination step, and thereby produce the catalytically active hydrogen form of the galliosilicate molecular sieve.

The resultant activated crystalline, galliosilicate molecular sieve may be used as a component of a catalyst for converting hydrocarbons and other organic compounds, i.e., compounds containing one or more carbon atoms, into more valuable reaction products by acid catalyzed reactions, such as alkylation, transalkylation, dealkylation, isomerization, reforming, dehydrocyclization, dehydrogenation, hydrogenation, cracking, hydrocracking, dewaxing, hydrodewaxing, oligomerization, aromatization, alcohol conversion reactions, the conversion of syngas to mixtures of hydrocarbons and the like. In utilizing the activated galliosilicate as a catalyst component in conversion processes as described above, it will normally be combined with a porous, inorganic refractory oxide component, or a precursor thereof, such as alumina, silica, titania, magnesia, zirconia, beryllia, silica-alumina, silica-magnesia, silica-titania, a dispersion of silica-alumina in gamma alumina, a clay such as kaolin, hectorite, sepiolite and attapulgite, combinations of the above and the like. The preferred porous, inorganic refractory oxide component will depend upon the particular conversion process involved and will be well known to those skilled in the art. Examples of precursors that may be used include peptized alumina, alumina gel, hydrated alumina, silica-alumina hydrogels, Ziegler-derived aluminas and silica sols. The exact amounts of crystalline galliosilicate and porous, inorganic refractory oxide used in the catalyst will again depend upon the particular conversion process in which the catalyst is to be used.

It will be understood that, although the primary use of the catalyst will be in hydrocarbon conversion processes to convert hydrocarbon feedstocks into desirable reaction products, the catalyst can also be used to convert feedstocks or organic compounds other than hydrocarbons into desired reaction products. For example, the catalyst can be used to convert alcohols into transportation fuels and to convert gaseous mixtures of carbon monoxide and hydrogen into hydrocarbons. Also, the catalyst may be used to control atmospheric emissions of nitrogen oxides by selectively reducing mixtures of nitrogen oxides to nitrogen and water in the presence of ammonia.

Depending on the particular type of conversion process in which the catalyst containing the activated galliosilicate molecular sieve with the mordenite structure is to be used, it may be desirable that the catalyst also contain a metal promoter or combination of metal promoters selected from Group IB, Group IIB, Group IIIA, Group IVA, Group VA, Group VIB, Group VIIB and Group VIII of the Periodic Table of elements. As used herein "Periodic Table of Elements" refers to the version found in the inside front cover of the "Handbook of Chemistry and Physics," 65th edition, published in 1984 by the Chemical Rubber Company, Cleveland, Ohio. Specific metal components which may be used as promoters include components of copper, silver, zinc, aluminum, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. These metal promoters may be ion exchanged into the crystalline galliosilicate itself, they may be incorporated into the mixture of the crystalline galliosilicate and the porous, inorganic refractory oxide, or they may be added by impregnation after the catalyst particles have been formed.

The catalyst is normally prepared by mulling the activated version of the crystalline galliosilicate molecular sieve produced in accordance with the process of the invention in powder form with the porous, inorganic refractory oxide component. If desired, a binder such as peptized Catapal alumina may be incorporated into the mulling mixture, as also may be one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four-leaf clovers. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the extruded catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with the activated galliosilicate having the mordenite structure and the porous, inorganic refractory oxide component to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in the air at a temperature normally ranging between about 800° F. and about 1100° F. to produce the finished catalyst particles.

In addition to the crystalline, galliosilicate molecular sieve having the mordenite structure, the catalyst may also contain other molecular sieves such as aluminosilicates, borosilicates, aluminophosphates, silicoaluminophosphates, naturally occurring zeolites, pillared clays and delaminated clays. Suitable aluminosilicates for combining with such a crystalline galliosilicate include Y zeolites, ultrastable Y zeolites, X zeolites, zeolite beta, zeolite L, faujasite and zeolite omega. The actual molecular sieve used in combination with the crystalline galliosilicate will depend upon the particular conversion process in which the resultant catalyst is to be used. The molecular sieve of choice is normally incorporated into the catalyst by mixing the molecular sieve with the crystalline galliosilicate and porous, inorganic refractory oxide prior to mulling and extrusion.

It is typically preferred to use catalysts containing the crystalline galliosilicate molecular sieve having the mordenite structure to selectively reduce mixtures of nitrogen oxides to nitrogen and water in the presence of ammonia, as an alkylation catalyst in the absence of hydrogen, or in hydroconversion processes such as hydrocracking, isomerization and hydrodewaxing. When used in hydroconversion processes, the catalyst will normally contain hydrogenation components comprising metals selected from Group VIII and/or Group VIB of the Periodic Table of Elements. These hydrogenation metal components are incorporated into the catalyst extrudates either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component.

If the hydrogenation metal component consists essentially of one or more noble metals such as platinum or palladium or compounds thereof, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten or compounds thereof, it is normally desired that the finished catalyst particles contain between about 1.0 and about 40 weight percent of the hydrogenation metal components, preferably between about 3 weight percent and about 30 weight percent, calculated as the metal oxide.

Feedstocks that may be subjected to hydroconversion processes using the catalyst containing a galliosilicate molecular sieve synthesized in accordance with the process of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at which the hydroconversion process takes place is between about 450° F. and about 850° F., preferably between about 600° F. and about 800°60 F. The pressure will normally range between about 750 and about 3500 p.s.i.g., preferably between about 1000 and about 3000 p.s.i.g. The liquid hourly space velocity (LHSV) is typically between about 0.3 and about 5.0 reciprocal hours, preferably between about 0.5 and about 3.0. The ratio of hydrogen gas to feedstock utilized will usually range between about 1000 and about 10,000 scf/bbl, preferably between about 2000 and about 8000 scf/bbl as measured at 60° F. and one atmosphere.

Since the crystalline, galliosilicate molecular sieve synthesized in accordance with the process of the invention has the mordenite structure, its effective pore size will be about 6.2 Angstroms, a pore size which makes such a crystalline galliosilicate particularly suited for use as a component of a catalyst employed in dewaxing or hydrodewaxing processes. Dewaxing and hydrodewaxing differ from hydrocracking in that these processes involve the selective cracking of molecules and produce a product having a boiling point range similar to that of the feedstock because essentially only the straight and slightly branched chain paraffin molecules in the feedstock are cracked while essentially all the highly branched chain paraffins, aromatic and cyclic molecules in the feedstock remain unchanged. Hydrocracking, on the other hand, involves the indiscriminate or nonselective cracking of molecules in the presence of added hydrogen and always results in a product having a boiling point range significantly different from that of the feedstock because a substantial proportion of all types of molecules comprising the feedstock are converted into lower boiling components. Hydrodewaxing differs from dewaxing in that the former is carried out in the presence of added hydrogen while the latter is not. When catalysts containing a crystalline galliosilicate with the mordenite structure are used in dewaxing or hydrodewaxing processes, the boiling point of the effluent from the dewaxing or hydrodewaxing zone will be approximately the same as the boiling point of the feedstock. In the case of maximum conversion in the dewaxing or hydrodewaxing zone, the boiling point of the effluent will be no more than about 20° F. lower than that of the feedstock.

The nature and objects of the invention are further illustrated by the following examples, which are provided for illustrative purposes only and not to limit the invention as defined by claims. The examples demonstrate a method of synthesizing a crystalline galliosilicate with the mordenite structure using relatively small amounts of a quaternary ammonium templating agent and water.

EXAMPLE 1

An aqueous solution of sodium hydroxide is prepared by dissolving commercial grade sodium hydroxide crystals in distilled water. Gallium oxide is then added to the solution and the resultant mixture is vigorously stirred under boiling conditions until the gallium oxide is completely dissolved. Benzyltriethylammonium chloride is then added to the basic solution of gallium oxide and the mixture is stirred for an additional 30 minutes. After stirring, Ludox HS-40, a colloidal silica sol manufactured and sold by the DuPont Chemical Company, is added to the stirred mixture to form a hydrogel having the following composition expressed in terms of oxide mole ratios:

$Ga_2O_3$:12.0 $SiO_2$:2.84 $Na_2O$:2.0
[$C_6H_5CH_2N(CH_2CH_3)_3$]$_2$O:170 $H_2O$

The resultant hydrogel is stirred at ambient temperature for 10 hours and then heated without substantial agitation at 150° C. in an autoclave for about 4 weeks. The crystals of galliosilicate formed have the following composition expressed in terms of oxide mole ratios in the anhydrous state:

$Ga_2O_3$:10.9 $SiO_2$:0.80 $Na_2O$:0.21
[$C_6H_5CH_2N(CH_2CH_3)_3$]$_2$O

Figure 2:
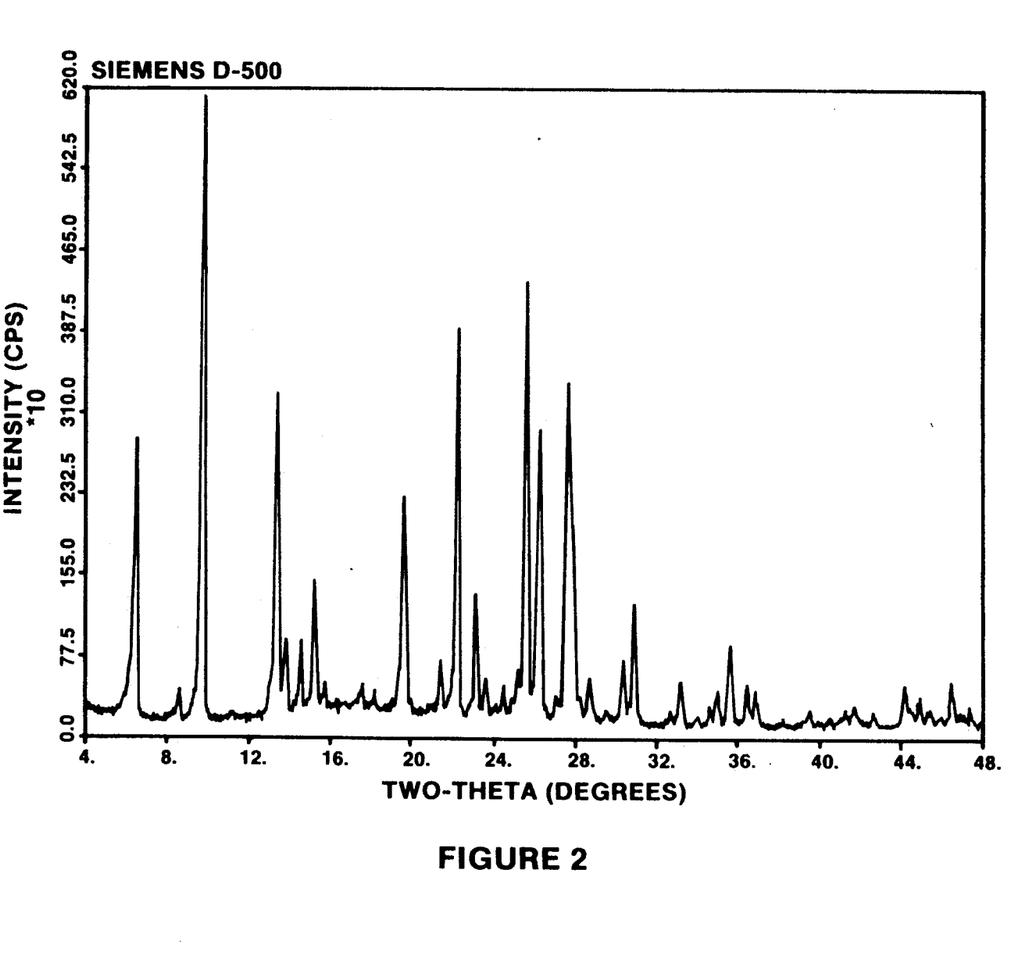
FIG. 2 depicts the X-ray powder diffraction pattern of a molecular sieve of the invention synthesized in accordance with the process of the invention as exemplified in Example 1.

An X-ray diffractogram of the crystals is obtaineg using a Siemens D-500 X-ray diffractometer with graphite-crystal monochromatized Cu-K alpha radiation. The resultant X-ray powder diffraction pattern is shown in FIG. 2 and the corresponding X-ray powder diffraction data including the calculated d-spacings are set forth in Table 4 below.

TABLE 4

X-Ray Powder Diffraction Data for the Crystalline Galliosilicate of Example 1

| Bragg Angle 2-Theta (Degrees) | Interplanar d-spacings (Angstroms) | Relative Intensity (100 × I/I$_o$) |
|---|---|---|
| 6.480 | 13.6412 | 44.8 |
| 8.603 | 10.2787 | 4.7 |
| 9.745 | 9.0762 | 100.0 |
| 13.423 | 6.5963 | 48.6 |
| 13.834 | 6.4014 | 11.6 |
| 14.581 | 6.0749 | 10.7 |
| 15.277 | 5.8000 | 19.7 |
| 15.751 | 5.6265 | 3.7 |
| 17.594 | 5.0408 | 4.0 |
| 18.178 | 4.8803 | 3.1 |
| 19.615 | 4.5258 | 34.4 |
| 21.454 | 4.1420 | 7.8 |
| 22.241 | 3.9971 | 61.5 |
| 23.182 | 3.8369 | 18.6 |
| 23.630 | 3.7652 | 5.4 |
| 24.092 | 3.6940 | 1.4 |
| 24.531 | 3.6289 | 4.4 |
| 25.236 | 3.5291 | 6.9 |
| 25.619 | 3.4772 | 67.2 |
| 26.269 | 3.3926 | 43.2 |
| 27.090 | 3.2916 | 2.3 |
| 27.673 | 3.2236 | 52.2 |

TABLE 4-continued

X-Ray Powder Diffraction Data for the Crystalline Galliosilicate of Example 1

| Bragg Angle 2-Theta (Degrees) | Interplanar d-spacings (Angstroms) | Relative Intensity (100 × I/I$_o$) |
|---|---|---|
| 28.726 | 3.1078 | 6.4 |
| 29.609 | 3.0171 | 1.6 |
| 30.397 | 2.9406 | 8.7 |
| 30 887 | 2.8951 | 17.6 |
| 32.687 | 2.7397 | 2.2 |
| 33.178 | 2.7003 | 6.7 |
| 34.030 | 2.6346 | 1.5 |
| 34.634 | 2.5900 | 2.5 |
| 35.044 | 2.5606 | 4.4 |
| 35.633 | 2.5197 | 12.2 |
| 36.471 | 2.4636 | 5.5 |
| 36.893 | 2.4364 | 4.4 |
| 39.568 | 2.2777 | 2.3 |
| 41.745 | 2.1638 | 2.4 |

The X-ray powder diffraction pattern set forth in FIG. 2 and the data set forth in Table 4 are substantially similar to the diffraction pattern and data set forth, respectively, in FIG. 1 and Table 3 for a zeolite with the mordenite structure. Thus, it is concluded that the crystalline galliosilicate synthesized in Example 1 has the mordenite structure. The orthorombic unit cell parameters for the synthesized crystals are calculated from the d-spacings to be as follows: a=18.08 Angstroms, b=20.49 Angstroms and c=7.525 Angstroms.

A portion of the synthesized crystals are examined using silicon-29 magic angle spinning NMR. The resultant spectrum contains three major resonances or bands at about −114.1 ppm, −104.5 ppm and −96.0 ppm. These resonances are attributed, respectively, to the presence of $Si(OSi)_4$, $Si(OSi)_3(OGa)$, and $Si(OSi)_2(OGa)_2$ units in the crystal lattice. The silicon-to-gallium atom ratio computed from the intensities of the three resonances is 5.60 and compares favorably with the 5.45 value measured by chemical analysis. These results show conclusively that gallium is in the framework structure of the synthesized galliosilicate.

EXAMPLE 2

A hydrogel is prepared as described in Example 1 except the amount of colloidal silica used is increased so that the composition of the gel expressed in terms of oxide mole ratios is as follows:

$Ga_2O_3$:15.0    $SiO_2$:2.84    $Na_2O$:2.0
[$C_6H_5CH_2N(CH_2CH_3)_3$]$_2$O:0:170 $H_2O$

The hydrogel is stirred at ambient temperature for 10 hours and then heated at 150° C. in an autoclave for about 4 weeks. The crystals of galliosilicate formed have the following composition expressed in terms of oxide mole ratios in the anhydrous state:

$Ga_2O_3$:12.1 $SiO_2$:0.89 $Na_2O$:0.12
[$C_6H_5CH_2N(CH_2CH_3)_3$]$_2$O

An X-ray diffractogram of the resultant crystals is obtained as described in Example 1 and is substantially similar to that set forth in FIG. 1 for a zeolite with the mordenite structure. Thus, it is concluded that the crystals are that of a galliosilicate having the mordenite structure. The orthorombic unit cell parameters of the crystals, which are calculated from the d-spacings derived from the X-ray powder diffraction pattern, are as follows: a=18.06 Angstroms, b =20.46 Angstroms and c=7.506 Angstroms.

A portion of the synthesized crystals is subjected to a silicon-29 magic angle spinning NMR to yield a spectrum containing resonances or bands at the same location as found in the spectrum obtained by the same procedure in Example 1, i.e., −114.1, −104.5 and −96.0 ppm. Like in Example 1, these resonances are attributed, respectively, to the presence in the crystal lattice of Si(OSI)$_4$, Si(OSi)$_3$(OGa), and Si(OSi)$_2$(OGa)$_2$ units. A silicon-to-gallium atom ratio of 5.79 is calculated from the intensities of these resonances and compares to a ratio of 6.05 measured by chemical analysis. The closeness of these numbers indicates that the majority of the gallium present in the synthesized crystals is in the framework structure.

It will be apparent from the foregoing that the invention provides a crystalline, galliosilicate molecular sieve having the mordenite structure and a cost effective method for preparing such a sieve using relatively small amounts of a quaternary ammonium templating agent and water. Catalysts containing such a molecular sieve are useful in a variety of chemical conversion processes, particularly hydrocarbon conversion processes such as isomerization and hydrodewaxing, and in the reduction of nitrogen oxides to nitrogen and water.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A crystalline, galliosilicate molecular sieve having the following composition expressed in terms of oxide mole ratios in the anhydrous state:

$$Ga_2O_3 : xSiO_2 : yM_2O : tQ_2O$$

where M is an alkali metal, Q is a benzyltriethylammonium cation, x equal 5.0 to 30, y equals 0.1 to 0.99, t equals 0.01 to 0.9, and y+t equals about 1.0, said crystalline galliosilicate molecular sieve having an x-ray powder diffraction pattern comprising at least the d-spacings set forth in Table 1 below:

TABLE 1

| Interplanar d-spacings (Angstroms) | Relative Intensity (100 × I/I$_o$) |
|---|---|
| 13.6 ± 0.40 | 20–60 |
| 9.0 ± 0.40 | 50–100 |
| 6.6 ± 0.40 | 20–60 |
| 4.5 ± 0.20 | 20–60 |
| 4.0 ± 0.20 | 40–90 |
| 3.5 ± 0.10 | 50–100 |
| 3.3 ± 0.10 | 30–80 |
| 3.1 ± 0.10 | 30–70 |
| 2.9 ± 0.10 | 10–40 |

2. A galliosilicate molecular sieve as defined by claim 1 wherein M is sodium.

3. A galliosilicate molecular sieve as defined by claim 1 wherein x equals 6 to 15.

4. A galliosilicate molecular sieve as defined by claim 1 having an X-ray powder diffraction pattern comprising at least the d-spacings set forth in Table 2.

5. A crystalline, galliosilicate molecular sieve comprising silicon, gallium, oxygen, a triethylammonium cation, and substantially no aluminum, said molecular sieve having an X-ray powder diffraction pattern characteristic of the mordenite structure.

6. A galliosilicate molecular sieve as defined by claim 5 further comprising sodium.

7. A galliosilicate molecular sieve as defined by claim 6 having the following composition expressed in terms of oxide mole ratios in the anhydrous state:

$$Ga_2O_3:xSiO_2:yNa_2O:tQ_2O$$

where Q is benzyltriethylammonium cation x equals 5.0 to 30, y equal 0.1 to 0.99, t equals 0.01 to 0.9, and y+t equals about 1.0.

8. A process for preparing a crystalline, galliosilicate molecular sieve having the mordenite structure, which process comprises:

(a) mixing a source of gallia, a source of silica, a source of an alkali metal, a quaternary ammonium compound containing a benzyltriethylammonium cation, and water to form a hydrogel having the following oxide mole ratios of components:
SiO$_2$/Ga$_2$O$_3$ = 5 to 40
M$_2$O/Ga$_2$O$_3$ = 1 to 15
H$_2$O/Ga$_2$O$_3$ = 80 to 500
Q$_2$O/Ga$_2$O$_3$ = 0.1 to 20
where M is an alkali metal and Q is a benzyltriethylammonium cation; and (b) crystallizing said hydrogel to form a galliosilicate molecular sieve having the mordenite structure.

9. A process a defined by claim 8 wherein M is sodium.

10. A process as defined by claim 8 wherein said hydrogel has the following oxide mole ratios of components:
SiO$_2$/Ga$_2$O$_3$ = 10 to 30
Na$_2$O/Ga$_2$O$_3$ = 2 to 5
H$_2$O/Ga$_2$O$_3$ = 100 to 400
Q$_2$O/Ga$_2$O$_3$ = 0.5 to 4.0

11. A process as defined by claim 8 wherein said crystalline galliosilicate molecular sieve having the mordenite structure contains less than about 0.2 weight percent aluminum.

12. A process as defined by claim 8 wherein said hydrogel is crystallized at a temperature between about 90° C. and about 176° C.

13. A galliosilicate molecular sieve as defined by claim 1 containing less than about 0.2 weight percent aluminum.

14. A process as defined by claim 8 wherein SiO$_2$/Ga$_2$O$_3$O equals 5 to 15.

15. A process as defined by claim 10 wherein SiO$_2$/Ga$_2$O$_3$ equals 10 to 15.

16. A process as defined by claim 8 wherein said quaternary ammonium compound is benzyltriethylammonium hydroxide.

17. A process as defined by claim 8 wherein said quaternary ammonium compound is benzyltriethylammonium chloride.

* * * * *

UNITED STATES PATENT AND TRADEMARK OFFICE
CERTIFICATE OF CORRECTION

PATENT NO. : 5,028,406

DATED : July 2, 1991

INVENTOR(S) : Mario L. Occelli

It is certified that error appears in the above-identified patent and that said Letters Patent is hereby corrected as shown below:

Cover page, section entitled "ABSTRACT," line 10, delete "yet" and insert --y+t--.

Claim 5, line 5, delete "triethylammonium" and insert --benzyltriethylammonium--.

Claim 7, line 18, delete "equal" and insert --equals--.

Claim 10, line 44, after "0.5 to 4.0" insert --.--.

Claim 12, line 51, delete "176° C." and insert --175° C.--.

Claim 14, lines 55 and 56, cancel "$SiO_2/-Ga_2O_3O$" and insert --$SiO_2/Ga_2O_3$--.

Signed and Sealed this

Second Day of March, 1993

*Attest:*

STEPHEN G. KUNIN

*Attesting Officer*     *Acting Commissioner of Patents and Trademarks*